(12) United States Patent
Ballantine et al.

(10) Patent No.: US 10,581,090 B2
(45) Date of Patent: Mar. 3, 2020

(54) FUEL CELL SYSTEM CONTAINING HUMIDITY SENSOR AND METHOD OF OPERATING THEREOF

(71) Applicant: BLOOM ENERGY CORPORATION, Sunnyvale, CA (US)

(72) Inventors: Arne Ballantine, Palo Alto, CA (US); Jayakumar Krishnadass, Sunnyvale, CA (US); David Weingaertner, Sunnyvale, CA (US); Andrew James Hall, San Francisco, CA (US); Venkat V. Ramani, Milpitas, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 179 days.

(21) Appl. No.: 15/803,461

(22) Filed: Nov. 3, 2017

(65) Prior Publication Data

US 2019/0140288 A1    May 9, 2019

(51) Int. Cl.

| | |
|---|---|
| *H01M 8/0267* | (2016.01) |
| *H01M 8/04492* | (2016.01) |
| *H01M 8/0432* | (2016.01) |
| *H01M 8/04746* | (2016.01) |
| *H01M 8/2425* | (2016.01) |
| *H01M 8/04089* | (2016.01) |
| *H01M 8/2483* | (2016.01) |

(52) U.S. Cl.
CPC ....... *H01M 8/0267* (2013.01); *H01M 8/0432* (2013.01); *H01M 8/04097* (2013.01); *H01M 8/04492* (2013.01); *H01M 8/04746* (2013.01); *H01M 8/2425* (2013.01); *H01M 8/2483* (2016.02)

(58) Field of Classification Search
CPC ......... H01M 8/04907; H01M 8/04104; H01M 8/04402; H01M 8/04514
See application file for complete search history.

(56) References Cited

U.S. PATENT DOCUMENTS

| | | |
|---|---|---|
| 6,924,053 B2 | 8/2005 | McElroy |
| 7,045,238 B2 | 5/2006 | Gottmann et al. |
| 7,591,880 B2 | 9/2009 | Levan et al. |
| 7,846,600 B2 | 12/2010 | Gottmann |
| 8,101,307 B2 | 1/2012 | McElroy et al. |
| 8,197,978 B2 | 6/2012 | Ballantine et al. |
| 8,211,583 B2 | 7/2012 | Weingaertner et al. |
| 8,273,487 B2 | 9/2012 | Gottmann |
| 8,435,689 B2 | 5/2013 | Venkataraman |

(Continued)

*Primary Examiner* — Gregg Cantelmo
(74) *Attorney, Agent, or Firm* — The Marbur Law Group PLLC

(57) ABSTRACT

Various systems and methods disclosed herein may include a fuel cell system that may dynamically respond to changes in steam concentration in the fuel cell system. The fuel cell system may include a fuel cell stack that produces an anode exhaust stream, an anode recycle blower that receives the anode exhaust stream and outputs an anode recycle stream, and a humidity sensor configured to measure the steam concentration of the anode recycle stream. The fuel cell system may also include a master controller configured to receive steam concentration measurement from the humidity sensor and control the operation of the anode recycle blower and/or other components based on the steam concentration measurement.

14 Claims, 6 Drawing Sheets

(56) References Cited

U.S. PATENT DOCUMENTS

| | | |
|---|---|---|
| 8,445,146 B2 | 5/2013 | Gottmann |
| 8,563,180 B2 | 10/2013 | Perry et al. |
| 8,877,399 B2 | 11/2014 | Weingaertner et al. |
| 8,968,943 B2 | 3/2015 | Perry et al. |
| 9,190,673 B2 | 11/2015 | Venkataraman et al. |
| 9,190,685 B2 | 11/2015 | McElroy et al. |
| 9,287,571 B2 | 3/2016 | McElroy et al. |
| 2005/0247106 A1* | 11/2005 | Speldrich ............... G01N 25/60 73/29.01 |
| 2006/0263657 A1* | 11/2006 | Kelly ....................... C01B 3/34 429/415 |
| 2007/0192046 A1* | 8/2007 | Hairston ............. G01F 25/0053 702/45 |
| 2009/0229377 A1* | 9/2009 | Ushigusa ................ G01F 1/363 73/861.61 |
| 2010/0047634 A1* | 2/2010 | Nguyen ............ H01M 8/04022 429/513 |
| 2010/0178578 A1* | 7/2010 | Milacic ............. H01M 8/04097 429/439 |
| 2010/0239924 A1 | 9/2010 | McElroy et al. |
| 2016/0043413 A1 | 2/2016 | McElroy et al. |
| 2017/0012309 A1 | 1/2017 | Venkat et al. |
| 2017/0110746 A1 | 4/2017 | Mack et al. |

\* cited by examiner

FUEL CELL SYSTEM CONTAINING HUMIDITY SENSOR AND METHOD OF OPERATING THEREOF

FIELD

The present disclosure relates to fuel cell systems and methods of operating thereof, such as fuel cell systems containing a humidity sensor.

BACKGROUND

Electrochemical devices, such as fuel cells, can convert energy stored in fuels to electrical energy with high efficiencies. In a fuel cell system, such as a solid oxide fuel cell (SOFC) system, an oxidizing flow is passed through the cathode side of the fuel cell while a fuel inlet flow is passed through the anode side of the fuel cell. The oxidizing flow is typically air, while the fuel flow can be a hydrocarbon fuel, such as methane, natural gas, pentane, ethanol, or methanol. The fuel cell enables the transport of negatively charged oxygen ions from the cathode flow stream to the anode flow stream, where the ion combines with either free hydrogen or hydrogen in a hydrocarbon molecule to form water vapor and/or with carbon monoxide to form carbon dioxide. The excess electrons from the negatively charged ion are routed back to the cathode side of the fuel cell through an electrical circuit completed between anode and cathode, resulting in an electrical current flow through the circuit. A fuel cell system may include multiple hot boxes, each of which may generate electricity. A hot box may include a fuel inlet stream that provides oxidizing fuel to one or more fuel stacks, where the fuel is oxidized during electricity generation. The oxidized fuel (i.e., the anode or fuel exhaust stream) travels through the fuel stacks and is exhausted from the fuel stacks. A portion of the anode exhaust stream may be recycled back into the fuel inlet stream.

SUMMARY OF THE INVENTION

Various systems disclosed herein may include a fuel cell system that may dynamically respond to changes in steam concentration in the fuel cell system. The fuel cell system may include a fuel cell stack that produces an anode exhaust stream, an anode recycle blower that receives the anode exhaust stream and outputs an anode recycle stream, and a humidity sensor configured to measure the steam concentration of the anode recycle stream. The fuel cell system may also include a master controller configured to receive steam concentration measurement from the humidity sensor and control the operation of the anode recycle blower and/or other components based on the steam concentration measurement.

Various methods disclosed herein for operating a fuel cell system may include providing a fuel inlet stream into a fuel cell stack, producing an anode exhaust stream from operation of the fuel cell stack, providing the anode exhaust stream to an anode recycle blower to output an anode recycle stream, and measuring, by a humidity sensor, a steam concentration of the anode recycle stream. The various methods may further include controlling, by a master controller, the operation of one or more components in the fuel cell module, including the anode recycle blower, based on the measured steam concentration of the anode recycle stream.

DETAILED DESCRIPTION OF THE EMBODIMENTS

Figure 1:
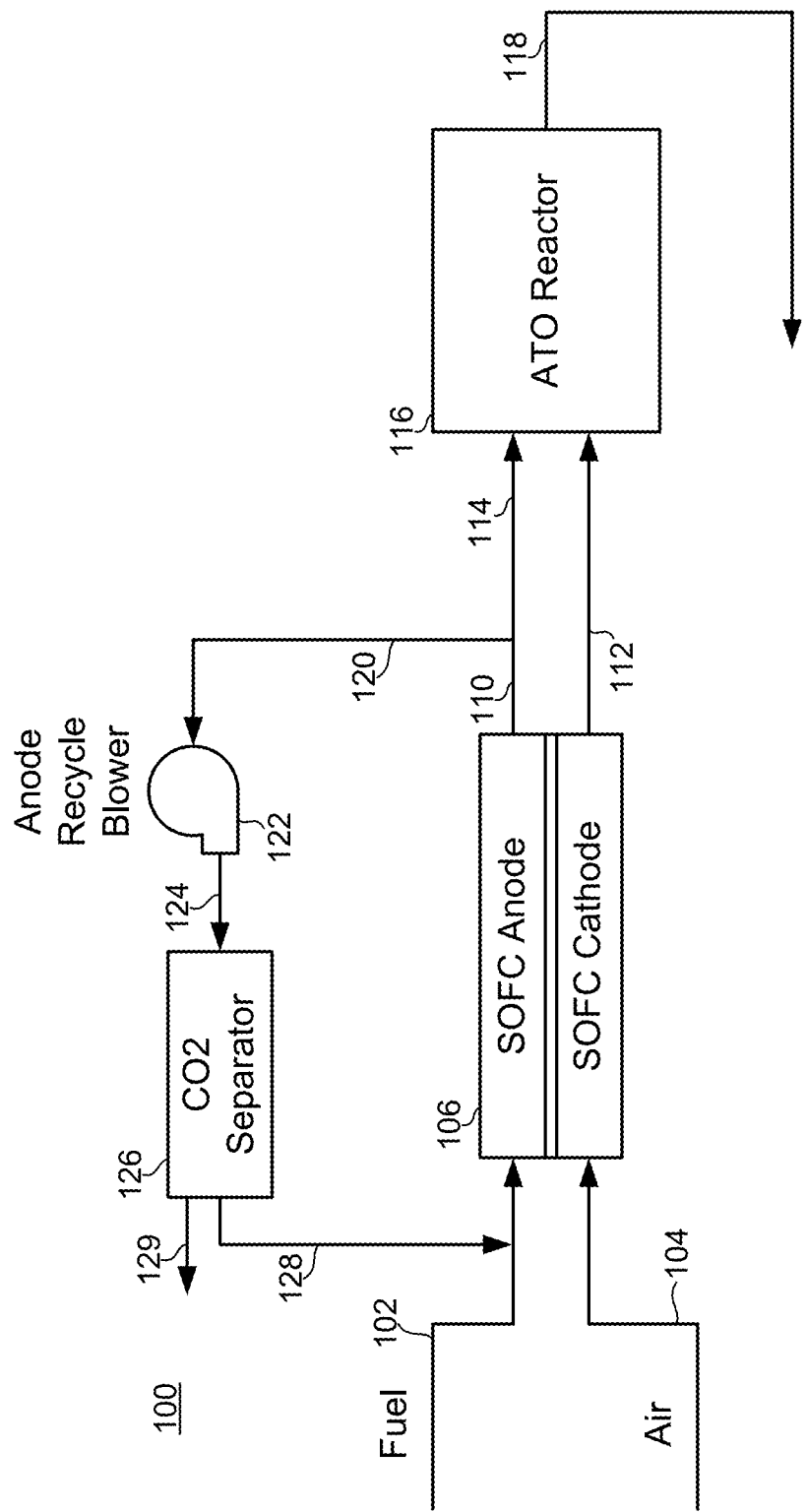
FIG. 1 is a schematic of a fuel cell system according to various embodiments.

Various examples will be described in detail with reference to the accompanying drawings. References made to particular examples and implementations are for illustrative purposes, and are not intended to limit the scope of the written description or the claims.

In a fuel cell system, the anode recycle stream that is fed back into the fuel inlet stream may be a mixture of carbon monoxide (CO), carbon dioxide ($CO_2$), hydrogen ($H_2$) and water (e.g., water vapor, $H_2O$), and the steady state temperature of the anode recycle stream may range between 90° C. to 180° C. The composition of the anode recycle stream may be determined from one time gas chromatography measurement. The anode recycle stream composition and concentrations, along with other measurements such as differential pressure and temperature, may be used in flow calculations to determine anode recycle flow characteristics.

If it is desired to change the fuel cell system process conditions during operation or to introduce new capabilities to the fuel cell system, then real time monitoring or near real time monitoring of the composition and concentration of the various components of the anode recycle stream may be useful. For example, if carbon dioxide is removed from the anode recycle stream, then some water (e.g., water vapor) may be removed along with the carbon dioxide. However, removal of water from the anode recycle stream may cause an imbalance in the steam to carbon ratio in the fuel inlet stream provided to the fuel cell stacks, and cause undesired coking of the anode electrodes of the fuel cells due to the lower than desired steam to carbon ratio of the fuel inlet stream. Physically opening the hot box of the fuel cell system and taking apart the fuel cell stacks to analyze the amount of coking of the anode electrodes is a destructive method of determining the coking of the anode electrodes.

In order to avoid coking of the anode electrodes or other undesirable fuel cell system operating states, it would be beneficial if the steam concentration, or steam to carbon ratio, of the anode recycle stream is monitored and adjusted in real time or near real time (e.g., in 10 minutes or less, such as 30 seconds to 5 minutes for example). The steam to carbon ratio the anode recycle stream may then be dynamically adjusted based on the real time measurements. Therefore, real time monitoring of the anode recycle stream composition may provide flexibility in changing the operation of the fuel cell system to prevent damage to the fuel cells and to improve fuel cell system performance.

The various embodiments described herein may allow for continuous or real time monitoring of the humidity (e.g., steam concentration) of the anode recycle stream in a fuel cell system by using a humidity sensor (e.g., a steam sensor, referred to as a "humidity/steam sensor" herein). Any change in the anode exhaust stream humidity beyond an acceptable limit may be detected by the sensor and communicated to a master controller. The master controller may select actions in response to the measurements to adjust the operation of the fuel cell system to improve performance and/or avoid damage.

FIG. 1 illustrates a fuel cell system 100 according to one embodiment of the present invention. Preferably, the system 100 is a high temperature fuel cell stack system, such as a solid oxide fuel cell (SOFC) system. The system 100 may be a regenerative system such as a solid oxide regenerative fuel cell (SORFC) system which operates in both fuel cell (i.e., discharge or power generation) and electrolysis (i.e., charge) modes or it may be a non-regenerative system which only operates in the fuel cell mode.

The system 100 contains a high temperature fuel cell stack 106. The stack may contain a plurality of SOFCs or SORFCs. The high temperature fuel cell stack 106 is illustrated schematically to show one solid oxide fuel cell of the stack containing a ceramic electrolyte, such as yttria or scandia stabilized zirconia, an anode electrode, such as a nickel-stabilized zirconia cermet, and a cathode electrode, such as lanthanum strontium manganite. Each fuel cell contains an electrolyte, an anode electrode on one side of the electrolyte anode chamber, a cathode electrode on the other side of the electrolyte in a cathode chamber, as well as other components, such as separator plates/electrical contacts, fuel cell housing and insulation. In an SOFC operating in the fuel cell mode, the oxidizer, such as air or oxygen gas, enters the cathode chamber, while the fuel, such as hydrogen or hydro-carbon fuel, enters the anode chamber. Any suitable fuel cell designs and component materials may be used. The system 100 further contains an anode tail gas oxidizer (ATO) reactor 116, an anode recycle blower 122, and an optional carbon dioxide separator 126. The carbon dioxide separator 126 may be omitted in some embodiments.

The system 100 operates as follows. The fuel inlet stream is provided into the fuel cell stack 106 through fuel inlet conduit 102. The fuel may comprise any suitable fuel, such as a hydrogen fuel or a hydrocarbon fuel, including but not limited to methane, natural gas which contains methane with hydrogen and other gases, propane or other biogas, or a mixture of a carbon fuel, such as carbon monoxide, oxygenated carbon containing gas, such as methanol, or other carbon containing gas with a hydrogen containing gas, such as water vapor, hydrogen gas or other mixtures. For example, the mixture may comprise syngas derived from coal or natural gas reformation. The fuel inlet conduit 102 provides the fuel inlet stream to the anode side of the fuel cell stack 106.

Air or another oxygen containing gas is provided into the stack 106 through an air inlet conduit 104. The air inlet conduit 104 provides air to the cathode side of the fuel cell stack 106.

Once the fuel and oxidant are provided into the fuel cell stack 106, the stack 106 is operated to generate electricity and a fuel exhaust stream. The fuel exhaust stream may contain hydrogen, water vapor, carbon monoxide, carbon dioxide, some un-reacted hydrocarbon gas, such as methane, and other reaction by-products and impurities.

The fuel exhaust stream (i.e., the stack anode exhaust stream) is provided from the stack 106 via fuel exhaust conduit 110. The air exhaust stream (i.e., the stack cathode exhaust stream) is provided from the stack air exhaust outlet via air exhaust conduit 112. The fuel exhaust conduit 110 is configured to provide a portion of the fuel exhaust stream to the ATO reactor 116 via ATO input conduit 114 and recycle a portion of the fuel exhaust stream via recycling conduit 120. The portion of fuel exhaust provided to the ATO reactor 116 and recycled via recycling conduit 120 may vary. For example 10% of the fuel exhaust may be provided to the ATO reactor 116 and 90% recycled. Alternatively, 50% of the fuel exhaust may be provided to the ATO reactor 116, while 50% is recycled. Additionally, 90% of the fuel exhaust or more may be provided to the ATO reactor, while 10% or less is recycled. The amount of recycled fuel provided into conduit 120 is controlled by anode recycle blower 122 power (e.g., by its blowing speed). The fuel exhaust stream provided into conduits 114 and 120 contains the same composition or content of hydrogen, carbon monoxide, water, and carbon dioxide. Air exhaust conduit 112 is configured to provide the air exhaust stream to the ATO reactor 116.

The ATO reactor 116 receives the fuel exhaust stream and air exhaust stream via ATO input conduit 114 and conduit 112, respectively. The ATO reactor uses the combined fuel exhaust stream and air exhaust stream to oxidize anode tail gas and output heated oxidized fuel (i.e., reactor exhaust) to ATO exhaust conduit 118.

The anode recycle blower 122 is coupled to recycling conduit 120 to provide the recycled fuel exhaust stream from recycling conduit 120 to a carbon dioxide separator 126 via recycling conduit 124. The anode recycle blower 122 may be computer or operator controlled and may vary the amount and/or rate of the recycled fuel exhaust stream being provided to the optional carbon dioxide separator 126 and also the amount and/or rate of the carbon dioxide free or carbon dioxide depleted recycled fuel exhaust stream being provided back to the stack 106. As such, the anode recycle blower 122 may be used to increase or decrease the overall recycling rate in system 100.

The carbon dioxide separator 126 may be a membrane type of carbon dioxide separator which continuously removes carbon dioxide by diffusion through the membrane. The carbon dioxide separator 126 may also include a separated carbon dioxide exhaust conduit 129 through which the separated carbon dioxide is removed from the separator 126.

As illustrated in both FIG. 1, the purified recycled fuel exhaust stream, with a reduced amount of carbon dioxide, is provided back to the fuel inlet stream for the fuel stack 106 via recycling conduit 128. The recycling of carbon dioxide depleted fuel exhaust into the fuel inlet increases the performance of the fuel cell stack 106.

Figure 2:
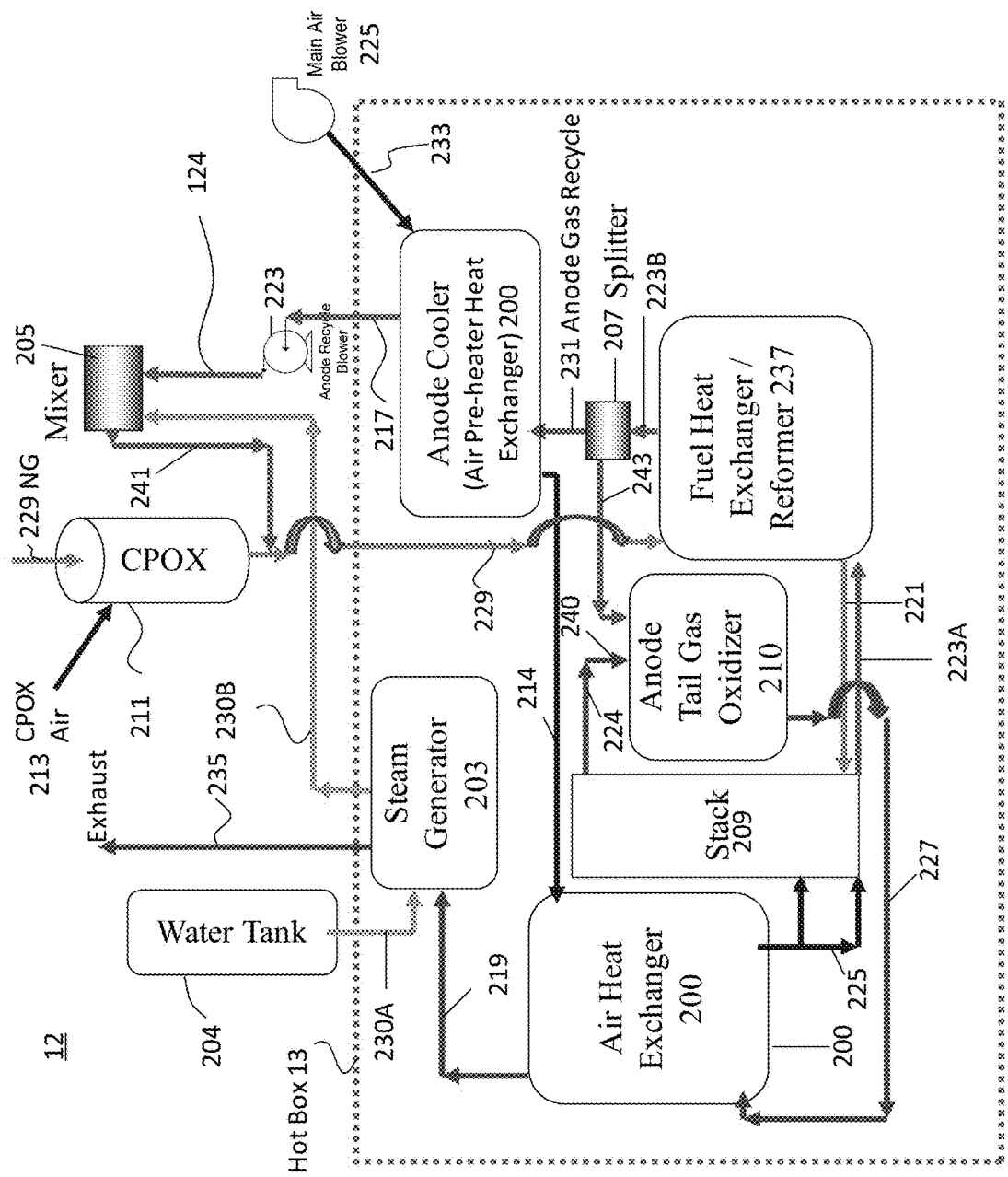
FIG. 2 is a schematic process flow diagram illustrating a hot box in a fuel cell system according to various embodiments.

FIG. 2 is a schematic representation of a fuel cell system 12 containing a hot box 13 and associated components, as described in U.S. Pat. No. 8,563,180 issued on Oct. 22, 2013 and incorporated herein by reference in its entirety.

The hot box 13 contains the plurality of the fuel cell stacks 209, such as a solid oxide fuel cell stacks (where one solid oxide fuel cell of the stack contains a ceramic electrolyte, such as yttria stabilized zirconia (YSZ) or scandia stabilized zirconia (SSZ), an anode electrode, such as a nickel-YSZ or Ni-SSZ cermet, and a cathode electrode, such as lanthanum strontium manganite (LSM)). The stacks 209 (corresponding to the fuel cell stack 106 of FIG. 1A) may be arranged over each other in a plurality of columns or segments.

The hot box 13 also contains a steam generator 203. The steam generator 203 is provided with water through conduit 230A from a water source 204, such as a water tank or a water pipe (i.e., a continuous water supply), and converts the water to steam. The steam is provided from generator 203 to mixer 205 through conduit 230B and is mixed with the stack anode (fuel) recycle stream in the mixer 205. The mixer 205 may be located inside or outside the hot box of the hot box 13. Preferably, the humidified anode exhaust stream is combined with the fuel inlet stream in the fuel inlet line or conduit 229 downstream of the mixer 205, as schematically shown in FIG. 2. Alternatively, if desired, the fuel inlet stream may also be provided directly into the mixer 205, or the steam may be provided directly into the fuel inlet stream and/or the anode exhaust stream may be provided directly into the fuel inlet stream followed by humidification of the combined fuel streams. The steam generator 203 is heated by the hot anode tailgas oxidizer ("ATO") 210 (corresponding to the ATO reactor 116 in FIG. 1) exhaust stream which is passed in heat exchange relationship in conduit 219 with the steam generator 203.

The system operates as follows. The fuel inlet stream, such as a hydrocarbon stream, for example natural gas, is provided into the fuel inlet conduit 229 and through a catalytic partial pressure oxidation (CPOx) reactor 211 located outside the hot box. During system start up, air is also provided into the CPOx reactor 211 through CPOx air inlet conduit 213 to catalytically partially oxidize the fuel inlet stream. The air may be blown through the air inlet conduit 213 to the CPOx reactor 211 by a CPOx air blower. The CPOx air blower may only operate during startup. During steady state system operation, the air flow is turned off (e.g., by powering off the CPOx air blower and closing a valve on the inlet air stream) and the CPOx reactor acts as a fuel passage way in which the fuel is not partially oxidized. Thus, the hot box 13 may comprise only one fuel inlet conduit which provides fuel in both start-up and steady state modes through the CPOx reactor 211. Therefore a separate fuel inlet conduit which bypasses the CPOx reactor during steady state operation is not required.

The fuel inlet stream is provided into the fuel heat exchanger (anode recuperator)/pre-reformer 237 where its temperature is raised by heat exchange with the stack 209 anode (fuel) exhaust streams. The fuel inlet stream is pre-reformed in the pre-reformer section of the heat exchanger 237 via the SMR reaction and the reformed fuel inlet stream (which includes hydrogen, carbon monoxide, water vapor and unreformed methane) is provided into the stacks 209 through the fuel inlet conduit(s) 221. The fuel inlet stream travels upwards through the stacks through fuel inlet risers in the stacks 209 and is oxidized in the stacks 209 during electricity generation. The oxidized fuel (i.e., the anode or fuel exhaust stream) travels down the stacks 209 through the fuel exhaust risers and is then exhausted from the stacks through the fuel exhaust conduits 223A (corresponding to the fuel exhaust conduit 110 of FIG. 1) into the fuel heat exchanger 237.

In the fuel heat exchanger 237, the anode exhaust stream heats the fuel inlet stream via heat exchange. The anode exhaust stream is then provided via the fuel exhaust conduit 223B into a splitter 207. A first portion of the anode exhaust stream is provided from the splitter 207 the ATO 210 via conduit (e.g., slits) 243 (corresponding to the ATO input conduit 114 of FIG. 1).

A second portion of the anode exhaust stream is recycled from the splitter 207 into the anode cooler 200 and then into the fuel inlet stream. For example, the second portion of the anode exhaust stream is recycled through conduit 231 (corresponding to the recycling conduit 120 in FIG. 1) into the anode cooler (i.e., air pre-heater heat exchanger) where the anode exhaust stream pre-heats the air inlet stream from conduit 233 (corresponding to the air inlet conduit 104 of FIG. 1). The anode exhaust stream is then provided by the anode recycle blower 223 (corresponding to the anode recycle blower 122 in FIG. 1) into the mixer 205. The anode exhaust stream is humidified in the mixer 205 by mixing with the steam provided from the steam generator 203. The humidified anode exhaust stream is then provided from the mixer 205 via humidified anode exhaust stream conduit 241 (corresponding to the recycling conduit 128 in FIG. 1) into the fuel inlet conduit 229 where it mixes with the fuel inlet stream.

The air inlet stream is provided by a main air blower 225 from the air inlet conduit 233 into the anode cooler heat exchanger 200. The blower 225 may comprise the single air flow controller for the entire system. In the anode cooler heat exchanger 200, the air inlet stream is heated by the anode exhaust stream via heat exchange. The heated air inlet stream is then provided into the air heat exchanger (cathode recuperator 200) via conduit 214. The heated air inlet stream is provided from heat exchanger 200 into the stack(s) 209 via the air inlet conduit and/or manifold 225.

The air passes through the stacks 209 into the cathode exhaust conduit 224 (corresponding to the air exhaust conduit 112 of FIG. 1) and through conduit 224 and mixer 240 into the ATO 210. In the ATO 210, the air exhaust stream oxidizes the split first portion of the anode exhaust stream from conduit 243 to generate an ATO exhaust stream. The ATO exhaust stream is exhausted through the ATO exhaust conduit 227 (corresponding to the ATO exhaust conduit 118 in FIG. 1) into the air heat exchanger 200. The ATO exhaust stream heats air inlet stream in the air heat exchanger 200 via heat exchange. The ATO exhaust stream (which is still above room temperature) is then provided from the air heat exchanger 200 to the steam generator 203 via conduit 219. The heat from the ATO exhaust stream is used to convert the water into steam via heat exchange in the steam generator 203. The ATO exhaust stream is then removed from the system via the exhaust conduit 235. Thus, by controlling the air inlet blower output (i.e., power or speed), the magnitude (i.e., volume, pressure, speed, etc.) of air introduced into the system may be controlled. The cathode (air) and anode (fuel) exhaust streams are used as the respective ATO air and fuel inlet streams, thus eliminating the need for a separate ATO air and fuel inlet controllers/blowers. Furthermore, since the ATO exhaust stream is used to heat the air inlet stream, the control of the rate of single air inlet stream in conduit 233 by blower 225 can be used to control the temperature of the stacks 209 and the ATO 210.

Thus, as described above, by varying the main air flow in conduit 233 using a variable speed blower 225 and/or a control valve is used to maintain the stack 209 temperature and/or ATO 210 temperature. In this case, the main air flow rate control via blower 225 or valve acts as a main system temperature controller. Furthermore, the ATO 210 temperature may be controlled by varying the fuel utilization (e.g., ratio of current generated by the stack(s) 209 to fuel inlet flow provided to the stack(s) 209). Finally the anode recycle flow in conduits 231 and 217 may be controlled by a variable speed anode recycle blower 223 and/or a control valve to control the split between the anode exhaust to the ATO 210 and anode exhaust for anode recycle into the mixer 205 and the fuel inlet conduit 229 (corresponding to the fuel inlet conduit 102 of FIG. 1).

In the configuration illustrated in FIG. 2, there may be no fuel and air inputs to the ATO 210. External natural gas or another external fuel may not be fed to the ATO 210. Instead, the hot fuel (anode) exhaust stream from the fuel cell stack(s) 209 is partially recycled into the ATO as the ATO fuel inlet stream. Likewise, there is no outside air input into the ATO. Instead, the hot air (cathode) exhaust stream from the fuel cell stack(s) 209 is provided into the ATO as the ATO air inlet stream.

Furthermore, the fuel exhaust stream is split in a splitter 207 located in the hot box 13. The splitter 207 is located between the fuel exhaust outlet of the anode recuperator (e.g., fuel heat exchanger) 237 and the fuel exhaust inlet of the anode cooler 200 (e.g., the air pre-heater heat exchanger). Thus, the fuel exhaust stream is split between the mixer 205 and the ATO 210 prior to entering the anode cooler 200. This allows higher temperature fuel exhaust stream to be provided into the ATO because the fuel exhaust stream has not yet exchanged heat with the air inlet stream in the anode cooler 200. For example, the fuel exhaust stream provided into the ATO 210 from the splitter 207 may have a temperature of above 350 C, such as 350-500 C, for example 375 to 425 C, such as 390-410 C. Furthermore, since a smaller amount of fuel exhaust is provided into the anode cooler 200 (e.g., not 100% of the anode exhaust is provided into the anode cooler due to the splitting of the anode exhaust in splitter 207), the heat exchange area of the anode cooler 200 may be reduced.

Figure 3:
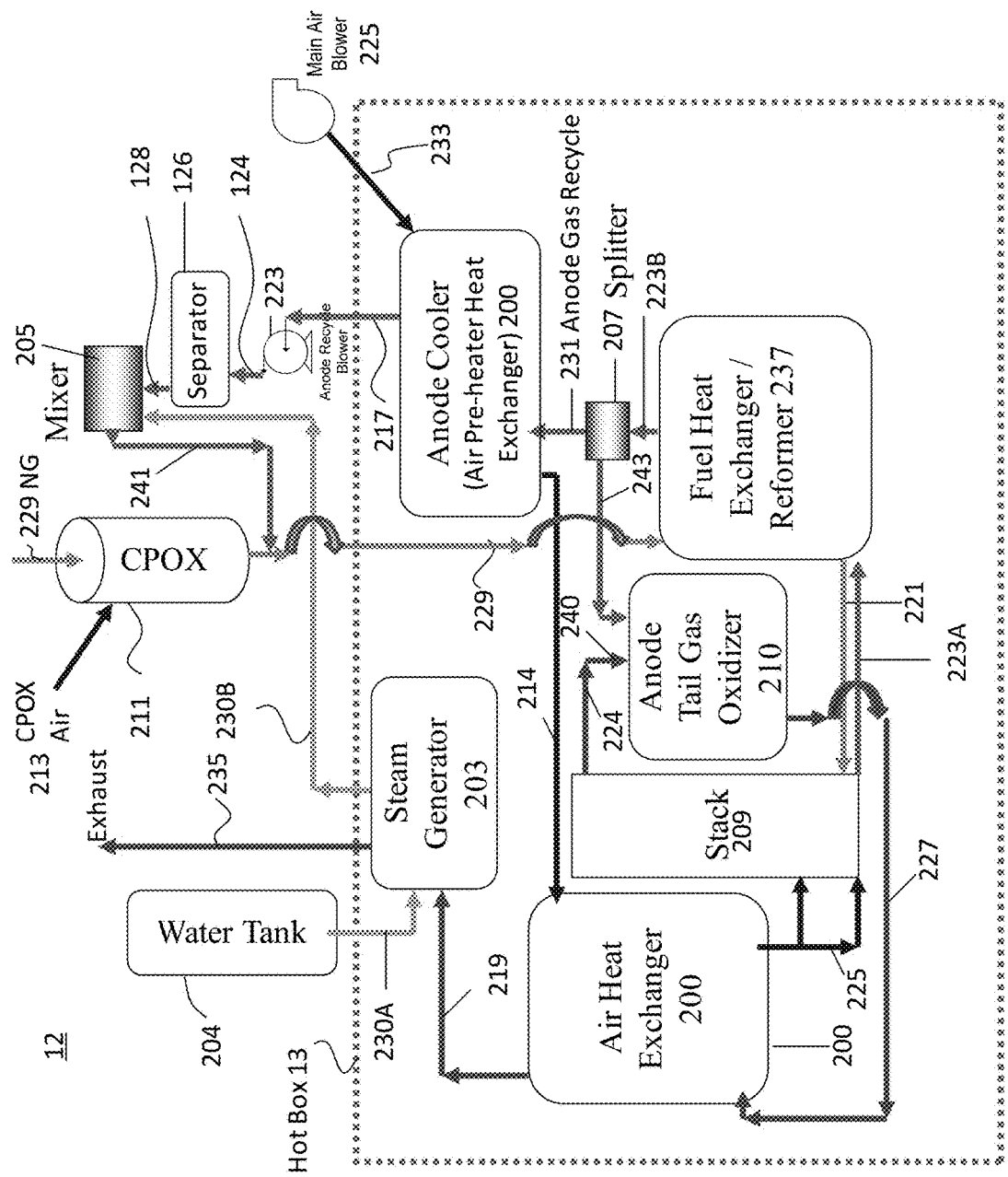
FIG. 3 is a schematic process flow diagram illustrating the fuel cell system of FIG. 2 with an additional carbon dioxide separator.

FIG. 3 is a more detailed schematic of the fuel cell system illustrated in FIG. 1 which includes the elements shown in FIG. 2. Specifically, as shown in FIG. 3, any suitable carbon dioxide separator, such as the membrane separator 126 described above, may be located between the anode recycle blower 223 and the mixer 205 of FIG. 2. Preferably, the carbon dioxide separator 126 is located outside the hot box 13. The respective conduits 124 and 128 are shown in FIG. 3.

The various embodiments described herein may allow for continuous or real time monitoring of the humidity (e.g., steam concentration) of the anode recycle stream in a fuel cell system. A humidity or steam sensor may be added to measure the humidity of the anode recycle stream. This sensor measures the total amount and/or relative percent humidity (e.g., in the form on steam and/or water vapor) and is referred to herein as "humidity/steam sensor". If the steam sensor measures relative humidity, then it may also optionally incorporate an absolute pressure measurement device into the humidity sensor or as a separate sensor to measure the absolute pressure of the stream which enters the steam sensor. The information obtained from the humidity/steam sensor, as well as from a flow meter attached to the anode recycle stream, may be provided to a master controller. The master controller may control various devices in the fuel cell system, such as an anode recycle blower and one or more valves, to control the anode recycle stream in order to improve performance and/or avoid damage to the fuel cells.

Figure 4:
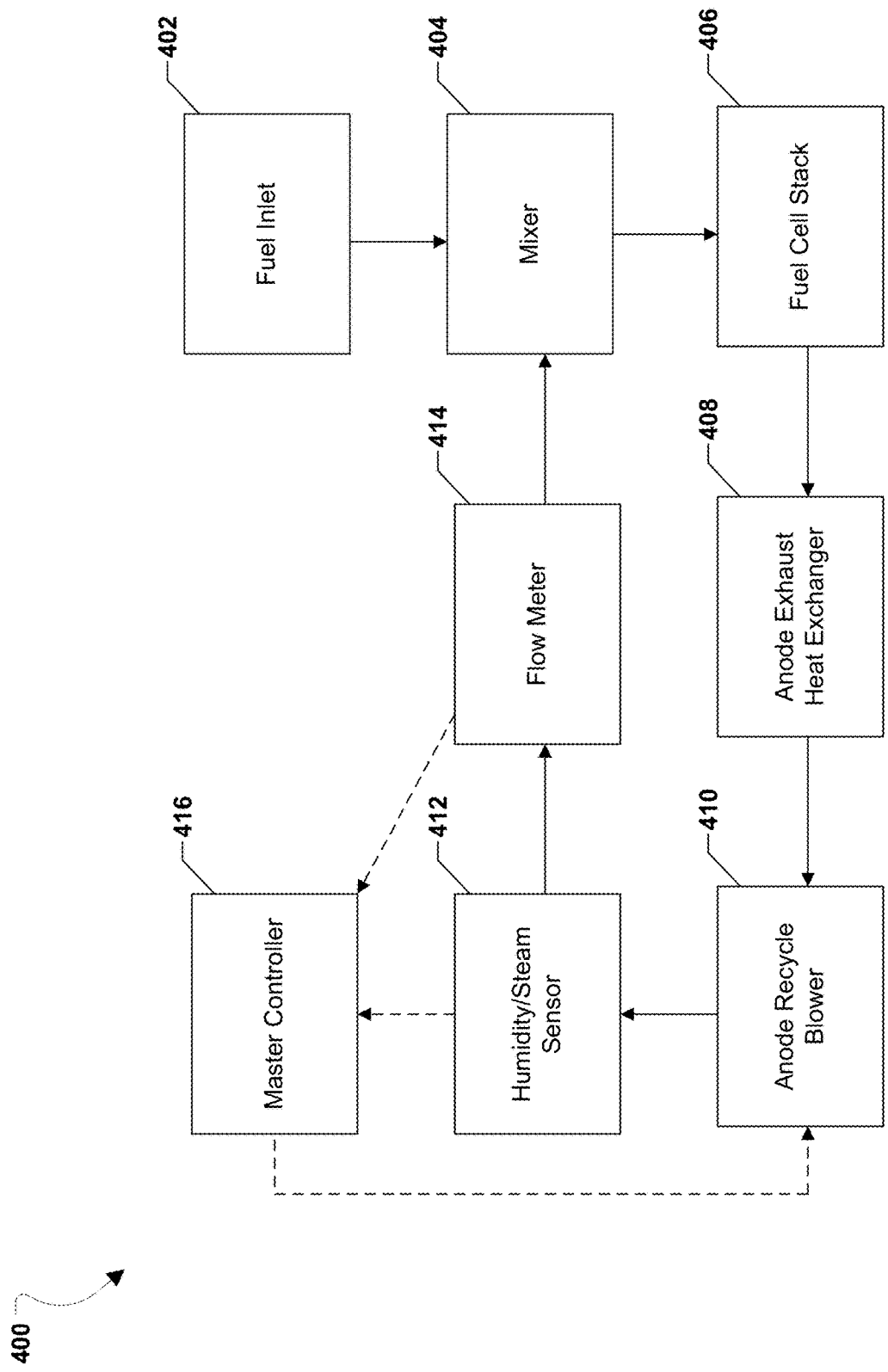
FIG. 4 is a schematic of a fuel cell module according to various embodiments.

FIG. 4 illustrates an example fuel cell module 400 in a fuel cell system for use in the various embodiments. The fuel cell module 400 may be similar to the system 12 and associated components illustrated in FIG. 3. The fuel cell module 400 may include a fuel inlet stream provided from a fuel inlet 402 (e.g., the fuel inlet conduit 102 in FIG. 1, such as the fuel inlet conduit 29 in FIG. 2 or 3). The fuel inlet stream may be, for example, a natural gas inlet flow. The fuel inlet stream may be fed to a mixer 404 (e.g., mixer 205 in FIG. 2 or 3), which mixes the fuel inlet stream with the recycled fuel that is part of the anode exhaust stream from the anode recycle stream. The mixer 404 provides the mixed fuel to the fuel cell stack 406 (e.g., the fuel cell stack (106, 209) of FIG. 1, 2 or 3), where it is consumed to produce electricity.

The oxidized fuel spent by the fuel cell stack 406 may be output as an anode exhaust stream into the anode exhaust heat exchanger 408 (e.g., the fuel heat exchanger 237 in FIG. 2 or 3), where anode exhaust stream may heat the fuel inlet stream via heat exchange. The anode exhaust stream may then be provided via a fuel exhaust conduit to a splitter (e.g., the splitter 207). A portion of the anode exhaust stream may be diverted from the splitter to a hot anode tailgas oxidizer, or ATO (e.g., ATO (116, 210) of FIG. 1, 2 or 3). Another portion of the anode exhaust stream may be diverted from the splitter to an anode cooler (i.e., an air pre-heater heat exchanger) and then to an anode recycle blower 410 (e.g., blower (122, 223) of FIG. 1, 2 or 3).

A humidity/steam sensor 412 may be placed at the output of the anode recycle blower 410. The humidity/steam sensor 412 may be used to measure the concentration of gaseous water present in the anode recycle stream from the anode recycle blower 410. In some embodiments, the humidity/steam sensor 412 may be capable of operating in temperatures ranging from −50° C. to 180° C. In some embodiments, the humidity/steam sensor 412 may be capable of operating in humidity or steam concentration ranges between 0% and 100%. In some embodiments, the humidity/steam sensor 412 may not be affected by cross-interference due to the presence of other cases in the anode recycle stream, such as carbon monoxide, carbon dioxide, and hydrogen.

The humidity/steam sensor 412 may include a network adapter and/or a communication interface (shown as dashed lines in FIG. 4) for wired or wireless communication with a master controller 416 that may be located remotely from the humidity/steam sensor 412. The humidity/steam sensor 412 may provide humidity/steam concentration concentrations to the master controller 416 on a continuous or real-time basis. In some embodiments, the response time for the humidity/steam sensor 412 to transmit measurements to the master controller 416 may be on the order of seconds. In some embodiments, the master controller 416 may also control the operation of the humidity/steam sensor 412, for example by setting the rate at which the humidity/steam sensor 412 takes measurements. The humidity/steam sensor 412 may include other components, such as additional sensors (e.g., thermometers), memory, and I/O components.

The anode recycle stream output from the anode recycle blower 410 may be provided to a flow meter 414. The flow meter 414 may be, for example, a Venturi flow meter. The flow meter 414 may measure the differential pressure of the anode recycle stream output from the anode recycle blower 410. The flow meter 414 may include a network adapter and/or a communication interface for wired or wireless communication with the master controller 416. The flow meter 414 may provide the differential pressure measurements of the anode recycle stream to the master controller 416. The anode recycle stream may then be fed back into the mixer 404 to be mixed with fuel inlet stream. The fuel cell module 400 may include additional components not illustrated in FIG. 4.

The master controller 416 may be a combination of hardware and/or software, for example an ASIC, a FPGA, or a computing device such as a server, desktop computer, or portable device. The master controller 416 may take as input the humidity/steam concentration measurements from the humidity/steam sensor 412 and the differential pressure measurements from the flow meter 414. The master controller 416 may also take input from other components in the fuel cell module 400, such as thermocouples or other sensors, and operational components of the fuel cell module 400 such as the anode recycle blower 410, mixer 404, and fuel cell stack 406.

The master controller 416 may be configured to change the operating conditions of the fuel cell module 400 based on the humidity/steam measurements of the humidity/steam sensor 412 and/or other inputs. The operating conditions that the master controller 416 may manipulate may include operating set points of fuel utilization, water injection, and the amount of anode exhaust stream recirculation (e.g., recycling) into the fuel inlet stream. To implement these changes, the master controller may be configured to control the operation of various components in the fuel cell module 400, such as changing the speed of the anode recycle blower 410 and/or opening/closing various valves in the fuel cell module 400. For example, the master controller 416 may compare the humidity/steam measurements, or change in the humidity/steam measurements, to upper and/or lower thresholds. If the humidity/steam concentration crosses an upper threshold, the master controller 416 may reduce the speed of the anode recycle blower 410 to reduce the ratio of steam to carbon in the anode recycle stream. If the relative change of the humidity/steam concentration crosses a lower threshold, the master controller 416 may increase the speed anode recycle blower 410 to increase the ratio of steam to carbon in the anode recycle stream. This may prevent damage to the fuel cell module 400 by preventing coking of the anode electrodes of the fuel cells and/or other undesirable operating conditions. In this manner, the humidity/steam sensor 412 and the master controller 416 may be used to monitor steam concentration in the anode recycle stream of a fuel cell system in real time and respond to changes in the steam concentration to improve performance and/or avoid damage to the fuel cells.

Figure 5:
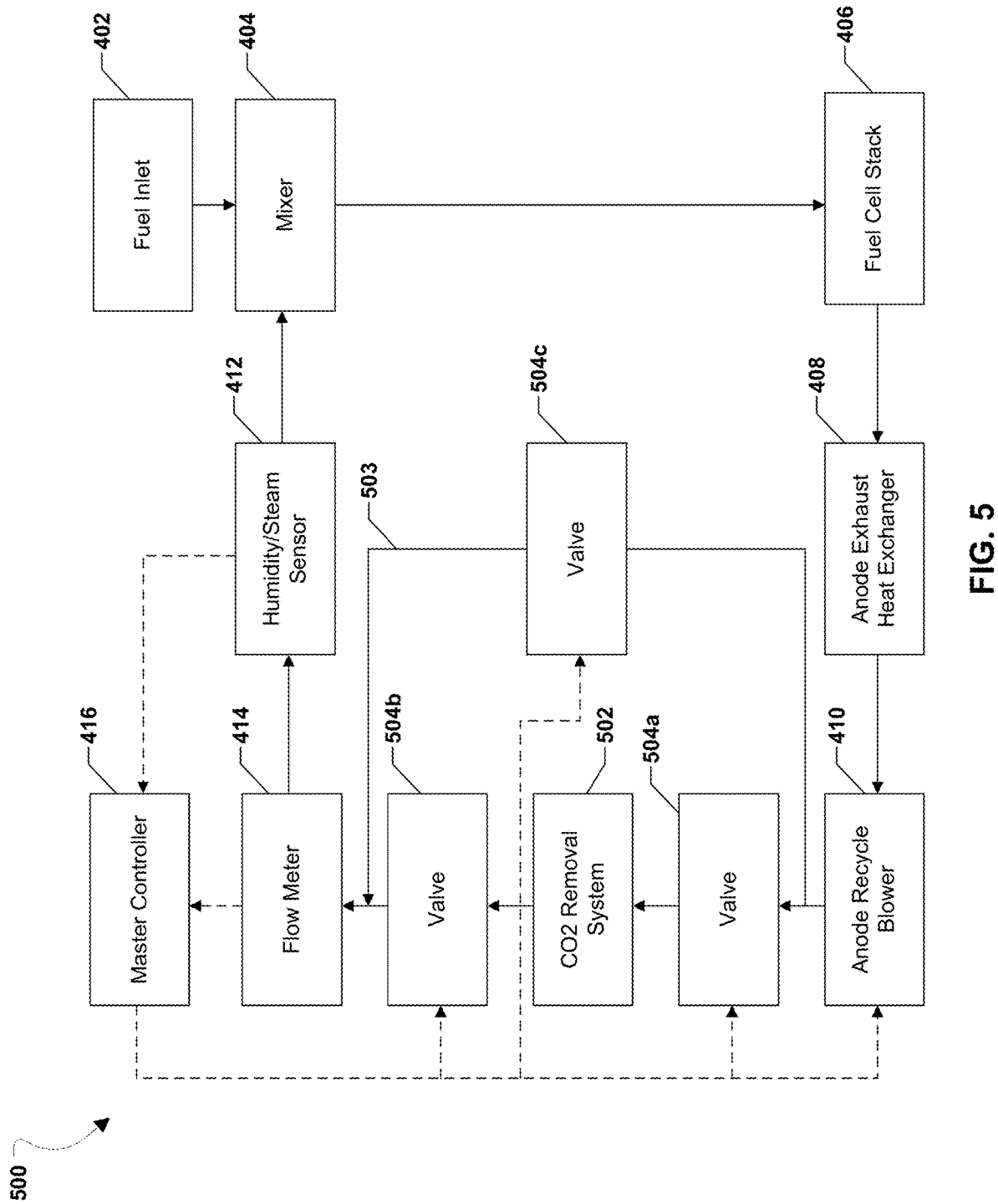
FIG. 5 is another schematic of a fuel cell module according to various embodiments.

In some embodiments, the master controller 416 may also be configured to control carbon dioxide removal in the anode recycle stream. This is shown in FIG. 5, which illustrates an example fuel cell module 500 in a fuel cell system for use in the various embodiments. The fuel cell module 500 may be similar to the fuel cell module 400 illustrated in FIG. 4. For example, the fuel cell module 500 may include fuel inlet 402, mixer 404, fuel cell stack 406, anode exhaust heat exchanger 408, anode recycle blower 410, humidity/steam sensor 412, flow meter 414, and master controller 416 as described with reference to FIG. 4.

The fuel cell module 500 may also include a carbon dioxide ($CO_2$) removal system 502 and a bypass conduit 503 which bypasses the $CO_2$ removal system 502. The carbon dioxide ($CO_2$) removal system 502 may be a membrane type carbon dioxide remover or it can be any other suitable carbon dioxide remover, such as a canister trap (e.g., adsorption type carbon dioxide remover) or an electrochemical carbon dioxide remover. The $CO_2$ removal system 502 may remove carbon dioxide from the anode recycle stream output of the anode recycle blower 410. In addition, one or more valves, may be used to control the input and output of the anode recycle stream to the $CO_2$ removal system 502 and/or to the bypass conduit 503.

The one or more valves may be any suitable valves, such as continuous valves (e.g., butterfly or gate valves) which can control the amount of flow through the valve in addition to being completely closed or completely open. For example, there may be three valves 504a-504c. However, two or more valves may be replaced by a single multi-way (e.g., three-way or four-way) valve. For example, valves 504a and 504c may be replaced by a single three-way valve located at the location of valve 504a. Valves 504b and 504c may be replaced by a single three-way valve located at the location of valve 504b.

For example, the anode recycle stream input to the optional $CO_2$ removal system 502 may be reduced or stopped by partially or fully closing the valve 504a. The anode recycle stream output of the $CO_2$ removal system 502 may be reduced or stopped by partially or fully closing the valve 504b. The $CO_2$ removal system 502 may be completely bypassed if valves 504a and 504b are closed and valve 504c in the bypass conduit 503 is opened. In some embodiments, a portion of the anode recycle stream may be fed through the $CO_2$ removal system 502 and the remaining portion may bypass the $CO_2$ removal system 502 by passing it through the bypass conduit 503 when all three valves 504a, 504b, 504c.

The master controller 416 may be configured to control the operation of the valves 504a-504c. The master controller 416 may open or close the valves 504a-504c to control the steam to carbon ratio of the anode recycle stream based on measurements from the humidity/steam sensor 412 and/or the flow meter 414. Thus the master controller 416 may affect the operating conditions of both the anode recycle blower 410 and the $CO_2$ removal system 502 to control the steam to carbon ratio of the anode recycle stream.

Thus, the anode recycle stream is provided through at least one of a carbon dioxide removal system 502 and a bypass conduit 503 which bypasses the carbon dioxide removal system 502. The master controller 416 controls a relative amount of the anode recycle stream provided through the bypass conduit 503 and through the carbon dioxide removal system 502 based on the measured steam concentration of the anode recycle stream.

For example, if the master controller 416 detects that the steam concentration of anode recycle stream crosses an upper threshold the master controller 416 may control (e.g., change) the speed of the anode recycle blower 410 to also change the steam to carbon ratio of the anode recycle stream. In order to determine how much water is removed in the $CO_2$ removal system, it may also be helpful to have a humidity sensor and flow meter for the gas entering the $CO_2$ removal system. Alternatively, the master controller 416 may change the operating characteristics of valves of 504a, 504b and/or 504c to change the percentage of fuel going through the $CO_2$ removal system. This has the primary effect of changing the amount of water and $CO_2$ removed by the $CO_2$ removal system. The desired direction of the change depends on the specific characteristics of the $CO_2$ removal system.

In one embodiment the master controller 416 may conduct an automated calibration and/or functional check of the humidity/steam sensor 412 by changing fuel cell operating parameters (e.g., by briefly turning on water flow, etc). The output of the humidity/steam sensor 412 is then compared to the output prior to turning on the water flow. If the sensor 412 detects the increased humidity/steam after the water flow is turned on, then the sensor passed the calibration/check. Otherwise, the master controller 416 may issue a service call to have the sensor 412 repaired and/or recalibrated.

In another embodiment, a redundant humidity/steam sensor 412 is provided in case of natural and/or temperature based drift of the sensor. A reading to trigger replacement or recalibration of the main and/or redundant sensor 412 to protect the system may also be performed.

Figure 6:
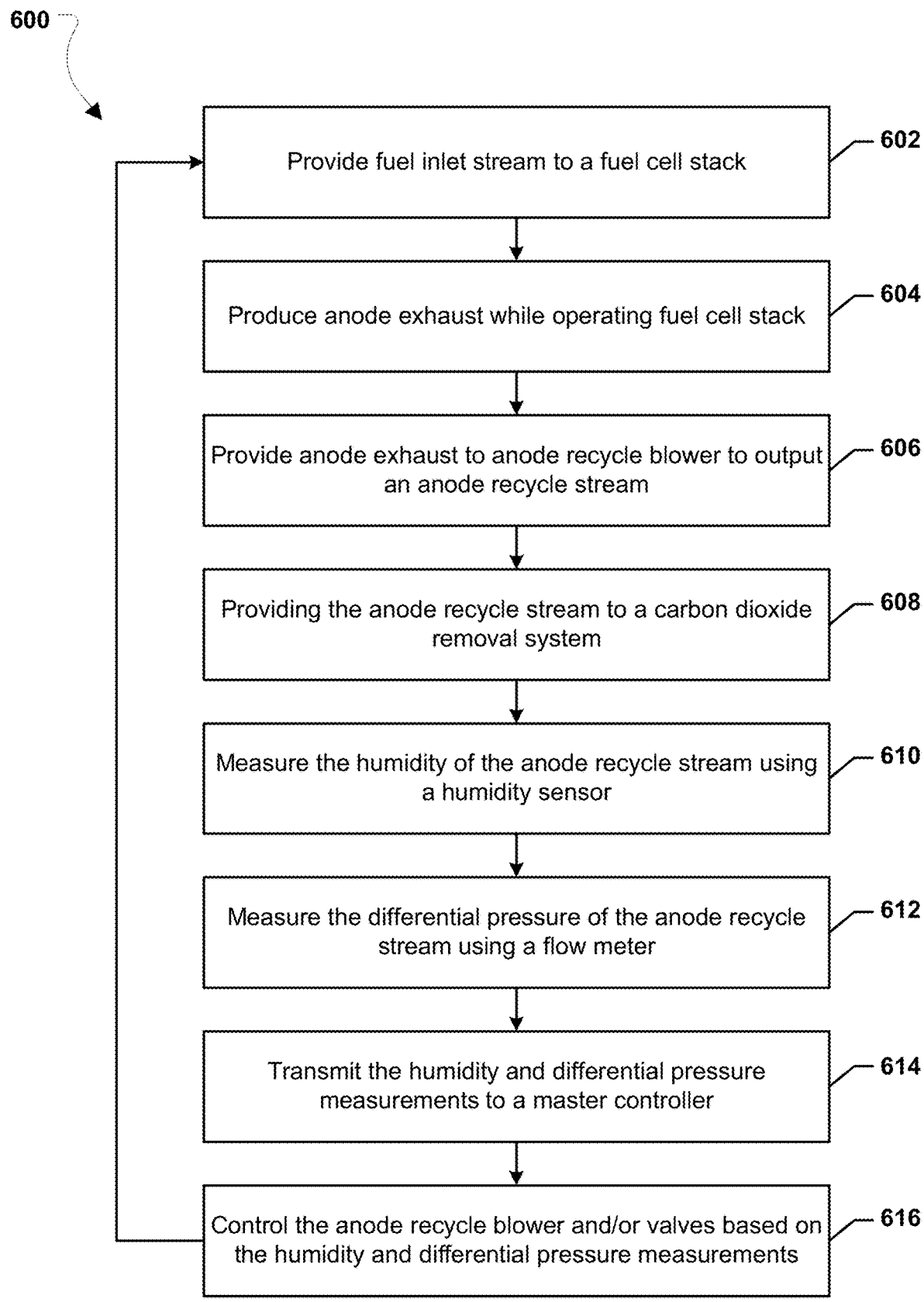
FIG. 6 is a process flow diagram of a method of operating a fuel cell system according to various embodiments.

FIG. 6 illustrates a method 600 for operating a fuel cell system according to various embodiments. The fuel cell system may include one or more fuel cell modules such as illustrated in FIGS. 4-5. In particular, each fuel cell module may include a humidity/steam sensor and a master controller for measuring the steam concentration of the anode recycle stream and controlling the operation of the fuel cell module based on the measurements.

In block 602, the fuel cell module may provide a fuel inlet stream to a fuel cell stack. The fuel inlet stream may include a fresh fuel inlet (e.g., natural gas) as well as an anode recycle stream from prior operation of the fuel cell stack. The fresh fuel of the fuel inlet stream and the anode recycle stream may be mixed together using a mixer (e.g., the mixer 404).

In block 604, the fuel cell module may generate an anode exhaust stream while operating the fuel cell stack. The anode exhaust stream may include oxidized fuel created while the fuel cell stack is generating electricity. The composition of the anode exhaust may include carbon monoxide, carbon dioxide, hydrogen, steam and optionally unused, unreformed hydrocarbon fuel (e.g., methane).

In block 606, the fuel cell module may provide the anode exhaust stream to an anode recycle blower 410 that outputs the anode recycle stream. For example, the anode exhaust produced from the fuel cell stack may be passed to a splitter. A portion of the anode exhaust may be diverted from the splitter to an anode tailgas oxidizer. Another portion of the anode exhaust may be diverted from the splitter to an anode cooler heat exchanger and then to the anode recycle blower. The speed of the anode recycle blower may affect the steam to carbon ratio of the anode recycle stream.

In block 608, the fuel cell system may provide the anode recycle stream to a carbon dioxide removal system 502, which may remove a portion of carbon dioxide from the anode recycle stream. There may be a number of valves (e.g., the valves 504a-504c) that control the flow of the anode recycle stream into and out of the carbon dioxide removal system and/or to bypass the carbon dioxide removal system. For example, the valves may be located at the input and output of the carbon dioxide removal system, as well as in a bypass conduit 503 so that the entire or part of the anode recycle stream may bypass the carbon dioxide removal system through the bypass conduit 503.

In block 610, a humidity/steam sensor 412 located at the output of the anode recycle blower 410 may measure the humidity (e.g., steam) concentration of the anode recycle stream. The humidity sensor may be capable of operating in temperatures ranging from 85° C. to 180° C., and may be capable of operating in humidity or steam concentration ranges between 0% and 100%. The humidity sensor may not be affected by cross-interference due to the presence of other cases in the anode recycle stream, such as carbon monoxide, carbon dioxide, and hydrogen.

In optional block 612, an optional flow meter (e.g., a Venturi flow meter) 414 may measure the differential pressure of the anode recycle stream. In block 614, the humidity sensor and optionally the flow meter may transmit the humidity (e.g., steam) concentration measurements and optionally the differential pressure measurements to a master controller 416. For example, the humidity sensor and the flow meter may be connected to the master controller 416 through a wired or wireless electronic connection. The measurements may be transmitted in real time.

In block 616, the master controller 416 may control one or more components in the fuel cell module, including the anode recycle blower 410 and/or the valves 504a-504c surrounding the carbon dioxide removal system 502 based on the humidity and optionally based on the differential pressure measurements. For example, the master controller may use the humidity and/or differential pressure measurements to determine the steam concentration and/or the steam to carbon ratio of the anode recycle stream. The master controller may compare the steam concentration, or change in steam concentration, to upper and/or lower thresholds. The upper and lower thresholds may represent limits for safe operation of the fuel cell module. Exceeding the limits may result in damage to the fuel cell module or suboptimal performance.

If the steam concentration, or change in steam concentration, crosses a threshold, the master controller may control the operation of the anode recycle blower, the valves, and/or other components to change the steam concentration. For example, the master controller may increase the speed of the anode recycle blower to increase the steam concentration in the anode recycle stream. In another example, the master controller may partially or fully close the valves leading to the carbon dioxide removal system and partially or fully open the valve in the bypass conduit 503 so that at least a portion of the anode recycle stream bypasses the carbon dioxide removal system 502. This may result in an increase in the concentration of carbon in the anode recycle stream.

In this manner, the method 600 allows for real time measurement of the steam concentration and steam to carbon ratio of the anode recycle stream in a fuel cell module. The measurements may then be used to dynamically control the operation of components in the fuel cell module to change the steam concentration and steam to carbon ratio of the anode recycle stream. This may allow the fuel cell module to improve performance and avoid damage if the steam concentration exceeds operational thresholds (e.g., avoiding coking of the anode electrodes).

The fuel cell systems described herein may have other embodiments and configurations, as desired. Other components, such as fuel side exhaust stream condensers, heat exchangers, heat-driven pumps, turbines, additional gas separation devices, hydrogen separators which separate hydrogen from the fuel exhaust and provide hydrogen for external use, fuel processing subsystems, fuel reformers and or water gas shift reactors, may be added if desired. Furthermore, it should be understood that any system element or method steps described in any embodiment and/or illustrated in any figure may also be used in systems and/or methods of other suitable embodiments described above even if such use is not expressly described.

The foregoing description of the invention has been presented for purposes of illustration and description. It is not intended to be exhaustive or to limit the invention to the precise form disclosed, and modifications and variations are possible in light of the above teachings or maybe acquired a practice of the invention. The description was chosen in order to explain the principles of the invention and its practical application. It is intended that the scope of the invention as defined by the claims appended hereto, and their equivalents.

The invention claimed is:

1. A fuel cell system, comprising:
   a fuel cell stack that produces an anode exhaust stream;
   an anode recycle blower that receives the anode exhaust stream and outputs an anode recycle stream;
   a humidity sensor configured to measure a steam concentration of the anode recycle stream;
   a carbon dioxide removal system configured to remove carbon dioxide from the anode recycle stream;
   a bypass conduit which bypasses the carbon dioxide removal system;

a plurality of valves for controlling a flow of the anode recycle stream through at least one of the carbon dioxide removal system and the bypass conduit; and a master controller configured to receive steam concentration measurement from the humidity sensor and control the operation of the anode recycle blower based on the steam concentration measurement, wherein the master controller is further configured to control the operation of the plurality of valves based on the steam concentration measurement.

2. The system of claim 1, further comprising a pressure sensor configured to measure an absolute pressure of the anode recycle stream.

3. The system of claim 2, wherein the master controller is further configured to receive an absolute pressure measurement from the pressure sensor, and control the operation of the anode recycle blower based on the steam concentration measurement and on the absolute pressure measurement.

4. The system of claim 1, further comprising a flow meter, wherein the master controller is further configured to receive a pressure measurement from the flow meter and control the operation of the anode recycle blower based on the steam concentration measurement and the pressure measurement.

5. The system of claim 1, further comprising a flow meter configured to measure differential pressure of the anode recycle stream, wherein the master controller is further configured to receive the differential pressure measurement from the flow meter and control the operation of the anode recycle blower based on the steam concentration measurement and the differential pressure measurement.

6. The system of claim 1, wherein the master controller is located remotely from the humidity sensor.

7. The system of claim 1, wherein the humidity sensor is capable of operating in temperatures between 85° C. and 180° C. and wherein the humidity sensor is capable of operating in a humidity range of 0% to 100%.

8. A method of operating a fuel cell system, comprising:
providing a fuel inlet stream into a fuel cell stack;
producing an anode exhaust stream from operation of the fuel cell stack;
providing the anode exhaust stream to an anode recycle blower to output an anode recycle stream;
measuring a steam concentration of the anode recycle stream; and
controlling an operation of at least one component of the fuel cell system to control a steam to carbon ratio of the anode recycle stream;
providing the anode recycle stream through at least one of a carbon dioxide removal system and a bypass conduit which bypasses the carbon dioxide removal system; and
controlling a relative amount of the anode recycle stream provided through the bypass conduit and through the carbon dioxide removal system based on the measured steam concentration of the anode recycle stream.

9. The method of claim 8, wherein controlling the operation of at least one component of the fuel cell system comprises changing a speed of the anode recycle blower based on the measured steam concentration of the anode recycle stream.

10. The method of claim 9, further comprising:
measuring a pressure of the anode recycle stream; and
changing a speed the anode recycle blower based on the measured steam concentration and the measured pressure of the anode recycle stream.

11. The method of claim 10, wherein the pressure comprises a differential pressure.

12. The method of claim 10, wherein the pressure comprises an absolute pressure.

13. The method of claim 9, wherein:
changing the speed of the anode recycle blower controls the steam to carbon ratio of the anode recycle stream; and
the step of measuring the steam concentration comprises measuring the steam concentration using a humidity sensor which is located remotely from the fuel cell stack.

14. The method of claim 9, wherein changing the speed of the anode recycle blower comprises:
comparing the steam concentration of the anode recycle stream to a threshold; and
changing the speed of the anode recycle blower when the steam concentration crosses the threshold.

* * * * *